Dec. 11, 1928.
W. A. MARRISON
TRANSLATING CIRCUITS
1,695,051
Filed May 6, 1925
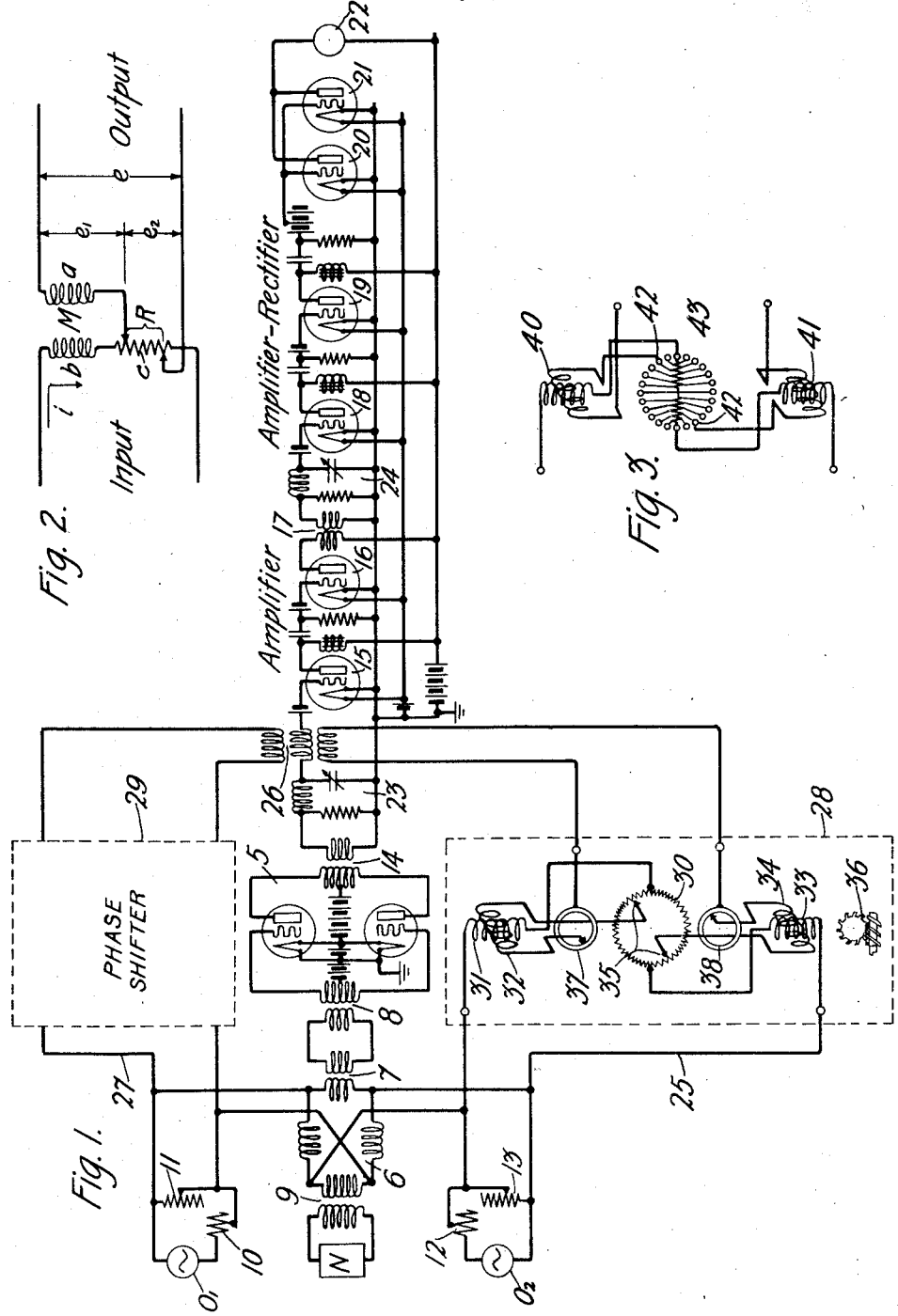
Inventor:
Warren A. Marrison
by E. W. Adams  Atty.

Patented Dec. 11, 1928.

1,695,051

UNITED STATES PATENT OFFICE.

WARREN A. MARRISON, OF EAST ORANGE, NEW JERSEY, ASSIGNOR, BY MESNE ASSIGNMENTS, TO WESTERN ELECTRIC COMPANY, INCORPORATED, A CORPORATION OF NEW YORK.

TRANSLATING CIRCUITS.

Application filed May 6, 1925. Serial No. 28,309.

This invention relates to translating circuits, and is particularly applicable to electrical testing and measuring.

An object of the invention is to simplify the examination and measurement of electrical characteristics.

A related object of the invention is to determine with accuracy and precision the characteristics of electrical circuits and apparatus.

Another object of the invention is to measure the different current components included in a complex wave.

Another object of the invention is to provide a new and improved phase shifter adapted for general use in the electrical arts, whereby any desired change of phase shift can be obtained without circuit interruption.

According to one of its embodiments, the invention provides a simple and efficient arrangement for measuring very small wave components in the presence of relatively large components.

In existing current analyzers, for example, considerable difficulty has been met in measuring such small components due to part of the larger components getting through to the rectifying tubes, in spite of the tuned circuits employed, and causing a steady deflection on the measuring device. This effect may be so great as to completely mask the resonance setting for the small component, or this setting may be indicated by only a slight change in the curvature of the curve of deflection versus capacity setting. In such a case it is difficult to determine whether the smaller component is present. In case the resonance setting for the small components is found, this deflection is always added to the steady deflection caused by the larger components. This gives a false reading which is invariably too large, particularly when great sensitivity is desired.

The difficulties outlined above are overcome in the present invention which provides means for eliminating the larger components by balancing them against waves of the same frequency but opposite phase. A particular feature of the invention resides in the provision of a novel form of phase shifter, so combining a mutual inductance for producing an induced voltage and a resistance for producing an IR drop, that any desired change of phase shift can be obtained without circuit interruption, by proportionately displacing an actuating element for the resistance and the inductance.

The various features and advantages of the invention will be apparent from the following detailed description read in conjunction with the accompanying drawing, in which:

Fig. 1 is a diagrammatic illustration of a testing system employing the invention.

Fig. 2 is a simplified sketch illustrating the theory of the operation of the phase shifter.

Fig. 3 illustrates diagrammatically a modification of the phase shifter shown in Fig. 1.

The testing system of Fig. 1 may be utilized to measure the distortion or intermodulation components produced by two or more waves which are simultaneously impressed upon the balanced amplifier 5. It is well known that such unwanted components are produced in amplifiers of this type due to the difficulty in securing tubes having identical characteristics and because of the impracticability of exactly balancing the corresponding branches of the divided circuit associated with the tubes.

Alternating current sources $O_1$ and $O_2$, which may be themionic oscillators of any well-known type, are conjugately connected to the input of the amplifier 5 by means of an alternating current bridge circuit 6 having equal ratio arms. One of the arms of the bridge is connected to the amplifier input circuit by means of coupling coils 7 and 8. A balancing network N, simulating the input impedance of the amplifier 5, is connected to the opposite arm of the bridge, thus preventing reaction between the circuits of oscillators $O_1$ and $O_2$.

The oscillators $O_1$ and $O_2$ are adapted to simultaneously impress waves of different frequencies on the input of amplifier 5. For purposes of illustration, the oscillator $O_1$ may generate a wave of 1,000 cycles frequency, and the oscillator $O_2$ may generate a wave of 10,000 cycles frequency. The voltage output of oscillator $O_1$ may be varied by means of a series resistance 10 and a shunt resistance 11 without changing the impedance of the circuit. Similar series and shunt resistances 12 and 13, respectively, are included in the output of oscillator $O_2$.

The output circuit of the amplifier 5 is coupled by means of transformer 14 to the input of a current analyzer circuit comprising an amplifier unit and an amplifier-rectifier unit.

The two-stage amplifier unit comprising thermionic electron discharge tubes 15 and 16 is coupled to the input of the amplifier-rectifier unit by means of transformer 17. The amplifier-rectifier unit comprises amplifier tubes 18 and 19 and detector tubes 20 and 21. A direct current measuring device such as a milliameter 22 is included in the output circuit of detector tubes 20 and 21.

A tuned circuit 23 is included in the input circuit of the amplifier unit, and a similar tuned circuit 24 is included in the input circuit of the amplifier-rectifier unit. Both tuned circuits may be adjusted to the frequency which it is desired to measure, and the rectified output of the current analyzer, indicated upon the measuring device 22, is a function of the alternating current transmitted by the tuned circuits.

It will be seen from the above that a wave of 1,000 cycles frequency generated by the oscillator $O_1$ and a wave of 10,000 cycles frequency generated by the oscillator $O_2$ are simultaneously impressed upon the input circuit of the amplifier 5. It has also been pointed out above that the waves of different frequencies tend to react in the amplifier circuit 5, thereby producing "cross-talk" which, in commercial signaling systems, interferes with the efficient reception of signals. This intermodulation may be measured, in accordance with the invention, with a view of determining the distortion produced in the amplifier.

When the wave of 10,000 cycles frequency is modulated by the wave of 1,000 cycles frequency in the amplifier 5, sideband frequencies of 9,000 cycles and 11,000 cycles are produced. Hence, the original frequencies of 1,000 cycles and 10,000 cycles, together with the sideband frequencies of 9,000 cycles and 11,000 cycles are impressed through the transformer 14 upon the current analyzer circuit. In order to properly determine the intermodulation in the amplifier 5, it is necessary to measure the upper and lower sidebands separately. If, therefore, it is desired to measure the upper sideband of 11,000 cycles frequency, the tuned circuits 23 and 24 are adjusted to resonate at 11,000 cycles. When the tuned circuits are thus adjusted, the 1,000 cycle wave transmitted through transformer 14 is, for all practical purposes, far enough away in the frequency scale from the 11,000 cycle sideband to be effectively suppressed in the tuned circuits, and hence may be disregarded. Great sensitivity is necessary in making accurate measurements, however, and it is assumed that the 9,000 and 11,000 cycle sidebands are not far enough away from the 10,000 cycle component to be clear of the resonance characteristic of the tuned circuit.

This resonance curve is not symmetrical about 10,000 cycles, and hence variations in the readings taken at resonance for the upper and lower sidebands are affected by the presence of the 10,000 cycle component. Hence, it is not even possible to make comparative readings of the two sidebands in the presence of the 10,000 cycle component.

In order to eliminate the 10,000 cycle component which is impressed upon the current analyzer circuit, in accordance with the invention, a portion of the 10,000 cycle current in the output of the oscillator $O_2$ is balanced against the current in the output of the amplifier 5 on test. The balance is so adjusted that the portion of the 10,000 cycle component which succeeds in passing the tuned circuit 23 is neutralized. Since the lower sideband of 9,000 cycles frequency is extremely small compared with the 10,000 cycle component, this sideband is effectively suppressed in the tuned circuit 23 and the upper sideband of 11,000 cycles frequency alone is amplified and rectified in the current analyzer circuit to give a reading on the measuring device 22.

To accomplish this, a balancing circuit 25 connected to the output of the oscillator $O_2$ is coupled to the input of the current analyzer circuit by means of a three-winding transformer 26, one winding of which is connected in the grid circuit of the first stage amplifier tube 15. The third winding of the transformer 26 is included in the output of a similar balancing circuit 27 connected to the output of the oscillator $O_1$. A phase shifter 28, constructed in accordance with the invention, is included in the balancing circuit 25, a similar phase shifter 29 being included in the balancing circuit 27.

The phase of the voltage transmitted through the balancing circuit 25 is so adjusted by means of the phase shifter 28 that the 10,000 cycle component which is transmitted through the balanced amplifier 5 and which succeeds in passing through the tuned circuit 23 is exactly neutralized in the transformer 26. In this way, only the upper sideband of 11,000 cycles frequency produced by intermodulation in the balanced amplifier 5 is amplified and rectified in the current analyzer circuit and caused to actuate the measuring device 22.

The 1,000 cycle component impressed upon the balancing circuit 27 from the oscillator $O_1$ may likewise be adjusted by the phase shifter 29 to exactly neutralize in the transformer 26 the 1,000 cycle component which is transmitted through the balanced amplifier 5. As pointed out above, this may not be necessary when measuring the 11,000 cycle sideband since, in such case, currents of 1,000 cycles frequency are readily suppressed in the tuned circuit 23. In other cases, however, it may be necessary or desirable to balance out both base frequency waves in the transformer 26 as, for example, when the waves generated by oscillators $O_1$ and $O_2$ are so close together in the frequency scale that the sideband to be measured is not clear of either resonance characteristic.

In making the measurements described above, the phase shifter 28 may be adjusted without circuit interruption to shift the phase of the current transmitted through the balancing circuit 25 through any angle without varying appreciably the output energy or the input impedance.

In order to shift the phase of an E. M. F. through any angle, it must be possible to add two potentials, which themselves differ in phase, in any amount and in either sense. The phase shifter 28 includes a potentiometer resistance 30 and mutual inductances, one of which includes a stationary coil 31 and a movable coil 32, and the other of which includes a stationary coil 33 and a movable coil 34. The potentiometer contacts 35 are adapted to be rotated simultaneously with movable coils 32 and 34 by means of a common shaft which may be actuated by a gear train 36. Slip rings 37 and 38 associated with the movable coils 32 and 34, respectively, permit the movable coils to be continuously rotated. The principles of operation of the phase shifter will be described in connection with Fig. 2.

In Fig. 2, the coils $a$ and $b$ are inductometer coils, one of which can be rotated to vary the mutual inductance between them. The coil $b$ and the resistance or potentiometer element $c$ are included in the input circuit of the phase shifter while the coil $a$ and a part or all of the resistance $c$, according to the amount of phase shift desired, are in the output circuit. The coil $a$ and the contacts of the potentiometer resistance are mounted on a common rotating shaft so that both the inductance and resistance can be varied simultaneously.

The current $i$ in the input circuit is equal to $I \sin \omega t$ and can be assumed constant for purposes of this discussion. The voltage $e_1$ is the voltage across the inductance $a$ and is equal to $E_1 \cos \omega t$, while $e_2$ is the voltage across the portion of the resistance $c$ included in the output circuit and is equal to $E_2 \sin \omega t$. Thus it follows that $e$ which is the total output voltage and the vector sum of $e_1$ and $e_2$ is equal to $E \sin (\omega t + \phi)$.

Since it is advisable for most purposes to have a constant amplitude of the output voltage regardless of phase, the distribution of the resistance of the potentiometer may be so chosen that the amplitude of the sum of $e_1 + e_2$ is equal to a constant. That is, the elements of the phase shifter may be so designed that for any angular displacement of the control shaft, and consequently the inductometer coils, the output voltage may be represented by $$E = \sqrt{E_1^2 + E_2^2} = I\sqrt{R^2 + \omega^2 M^2}$$

where E is the absolute or root mean square value of this voltage.

Since the impedance of the output circuit is high, there will be practically no current flowing therein, and the following relations approximately hold:

$$E_1 = IM\omega$$
$$E_2 = IR$$

and $$E = \sqrt{E_1 + E_2} = \sqrt{R^2 I^2 + M^2 \omega^2 I^2} \quad (1)$$

where M is the mutual inductance between the inductometer coils, R the resistance between the contacts on the potentiometer and $\omega$ is $2\pi f$.

If $\theta$ represents the angle between the inductometer coils, then the mutual inductance M varies as the cosine of the angle $\theta$; and where $m_0$ is the maximum inductance, $$M = M_0 \cos \theta.$$

Substituting for M in equation 1

$$E = I\sqrt{R^2 + \omega^2 M_0^2 \cos^2 \theta} \quad (2)$$

When the resistance contacts are in such position that $R = 0$, the total output voltage is provided by the coil $a$ so that $E = IM_0\omega$.

Now substituting for E in Equation 2 there results:

$$M_0^2 \omega^2 = R^2 + M_0^2 \omega^2 \cos^2 \theta$$
$$R^2 = M_0^2 \omega^2 (1 - \cos^2 \theta)$$
$$R^2 = M_0^2 \omega^2 \sin^2 \theta$$
$$R = M_0 \omega \sin \theta.$$

Given a definite value of $M_0$ and $f$ the distribution of resistance can be plotted as a function of $\theta$ by substituting in the final equation. This gives the basis for the potentiometer construction which provides a constant output voltage regardless of phase. When the potentiometer resistance 30 of the phase shifter of Fig. 1 is constructed in this manner, the actuating element of the resistance and the movable inductometer coils 32 and 34 may be proportionately displaced to simultaneously vary the mutual inductance and the resistance of the circuit in order to maintain the amplitude of the sum of the two potentials constant.

The phase shifter of Fig. 1 may also be continuously rotated by suitable power apparatus associated with the gear train 36 to modify at will the frequency of the current supplied by a frequency standard such as the oscillator $O_2$. As each revolution of the common control shaft shifts the phase of the wave impressed upon the circuit 25 by 360 degrees, rotation at the rate of one revolution per second will add or subtract one cycle from the frequency of such wave according to the direction of rotation.

Fig. 3 shows a modification of the phase shifter of Fig. 1 employing a different construction of the potentiometer resistance. Inductometer coils 40 and 41 are mounted on the same controlling shaft as the resistance contacts 42. The distribution of resistance in the potentiometer 43 is theoretically identical to that of the potentiometer resistance of the phase shifter 28.

While definite frequencies and specific circuit arrangements have been described for the purpose of illustrating the various features of the invention, it is to be understood that deviations may be made therefrom without departing from the spirit and scope of the invention as defined in the following claims.

What is claimed is:

1. A phase shifter comprising an incoming circuit, an outgoing circuit, a plurality of fixed and rotatable coils, a resistance element, said coils and resistance being conductively connected to said incoming and outgoing circuits, a plurality of rotatable resistance contacts engaging said elements and means for rotating said resistance contacts simultaneously with said rotatable coils whereby a shift in phase can be obtained between the voltages in said incoming and outgoing circuits.

2. A phase shifter comprising a pair of fixed coils, a rotatable coil inductively coupled with each of said fixed coils, a potentiometer resistance element, a pair of resistance contacts conductively connecting said potentiometer element to said rotatable coils, and means for rotating said contacts simultaneously with said rotatable coils for obtaining any desired shift in phase in currents passing through said coils and said potentiometer element.

3. A phase shifter comprising a plurality of fixed and rotatable coils, a resistance element, a plurality of rotatable resistance contacts engaging said element means for rotating said contacts simultaneously with said coils, and a plurality of slip rings and contacts associated therewith for maintaining a circuit between said coils and said resistance element.

4. A phase shifter comprising a pair of fixed coils, a rotatable coil associated with each of said fixed coils, resistance contacts rotatable with said rotatable coils, and a potentiometer resistance in circuit with said coils through said contacts, the relationship between the mutual inductance of said coils and the resistance of said potentiometer providing a constant output voltage with any shift in the phase angle thereof.

5. A phase shifter comprising a pair of fixed coils, a rotatable coil inductively coupled with each of said fixed coils, resistance contacts rotatable with said rotatable coils, a potentiometer resistance conductively connected to said coils through said contacts, and means for rotating said coils simultaneously with said contacts, the resistance being so distributed on said potentiometer that the value of the resistance between said contacts is a function of the angle between said fixed and rotatable coils.

6. A phase shifter comprising a mutual inductance device having fixed and movable coils for producing an induced voltage, a resistance conductively connected to said fixed and movable coils for producing an IR drop, means for effectively varying the amount of said resistance in circuit with said movable coils for obtaining any change of phase shift in currents through said coils and said resistance while maintaining a constant output voltage.

7. A phase shifter comprising an incoming line, an outgoing line, a pair of fixed coils, a rotatable coil inductively coupled with each of said fixed coils, a potentiometer resistance element, a pair of resistance contacts connecting said element to said rotatable coils, a pair of slip rings, a pair of slip ring contacts connecting said slip rings to said rotatable coils and means comprising a gear train for rotating said slip ring contacts, resistance contacts and rotatable coils, simultaneously for controlling the phase shift between said incoming and outgoing lines.

8. A phase shifting device comprising a pair of fixed coils, a rotatable coil inductively coupled with each of said fixed coils, a potentiometer, a pair of resistance contacts conductively connecting said potentiometer to said rotatable coils and means for moving said contacts simultaneously and continuously with said rotatable coils for obtaining any desired change in frequency in currents passing through said coils and said potentiometer.

9. A phase shifting device comprising an incoming line and an outgoing line, a pair of fixed coils, a rotatable coil inductively coupled with each of said fixed coils, a potentiometer resistance element, resistance contacts connecting said element to said rotatable coils, a pair of slip rings, a pair of slippering contacts connecting said slip rings to said rotatable coils, and means comprising a gear train for rotating said coils, resistance and slip ring contacts simultaneously and continuously for controlling the difference in frequency between the voltages in said incoming and outgoing lines.

10. A phase shifting device comprising a pair of fixed coils, a rotatable coil associated with each of said fixed coils, resistance contacts movable simultaneously and continuously with said rotatable coils, and a potentiometer resistance connected to said coils through said contacts providing a constant output voltage with any change of frequency between said outgoing voltage and an incoming voltage.

11. In a phase shifting device comprising an incoming circuit and an outgoing circuit, a plurality of fixed and rotatable coils, a resistance element, a plurality of movable resistance contacts engaging said element, said coils, contacts and resistance element conductively associated with said incoming and outgoing circuits, and means for moving said resistance contacts and rotatable coils simultaneously and continuously whereby a difference in frequency can be obtained and maintained between the voltages in said incoming and outgoing circuits.

In witness whereof, I hereunto subscribe my name this 5th day of May A. D., 1925.

WARREN A. MARRISON.